United States Patent [19]

Winterbottom

[11] 4,279,695

[45] Jul. 21, 1981

[54] PROCESS FOR THE MANUFACTURE OF COMPOSITE MATERIALS

[75] Inventor: Peter H. Winterbottom, Oldham, England

[73] Assignee: Turner & Newall Limited, Manchester, England

[21] Appl. No.: 97,448

[22] Filed: Nov. 26, 1979

[30] Foreign Application Priority Data

Dec. 9, 1978 [GB] United Kingdom ............... 47848/78
Aug. 13, 1979 [GB] United Kingdom ............... 28169/79

[51] Int. Cl.³ ............................................. D21H 5/12
[52] U.S. Cl. ................. 162/146; 162/181 R; 162/181 D
[58] Field of Search ................... 162/145, 146, 181 R, 162/181 D, 225, 154; 106/85, 93, 97, 99

[56] References Cited

U.S. PATENT DOCUMENTS

| | | | |
|---|---|---|---|
| 2,509,599 | 5/1950 | Hollenberg | 106/99 |
| 3,716,386 | 2/1973 | Kempster | 106/99 |
| 3,887,386 | 6/1975 | Majumdar | 106/99 |
| 4,101,335 | 7/1978 | Barrable | 106/99 |
| 4,159,302 | 6/1979 | Greve et al. | 106/99 |

Primary Examiner—Peter Chin
Attorney, Agent, or Firm—Stevens, Davis, Miller & Mosher

[57] ABSTRACT

In a process for the manufacture of composite material comprising a matrix of set inorganic binder (e.g. Portland cement) and reinforcing fibre (e.g. carbon fibre), by de-watering a slurry containing water-settable inorganic binder, reinforcing fibre and web-forming fibre (e.g. cellulose fibre), and subsequently setting the binder, a ball clay is included in the slurry that is de-watered, in order to reduce shrinkage of the composite material during setting of the binder.

5 Claims, 1 Drawing Figure

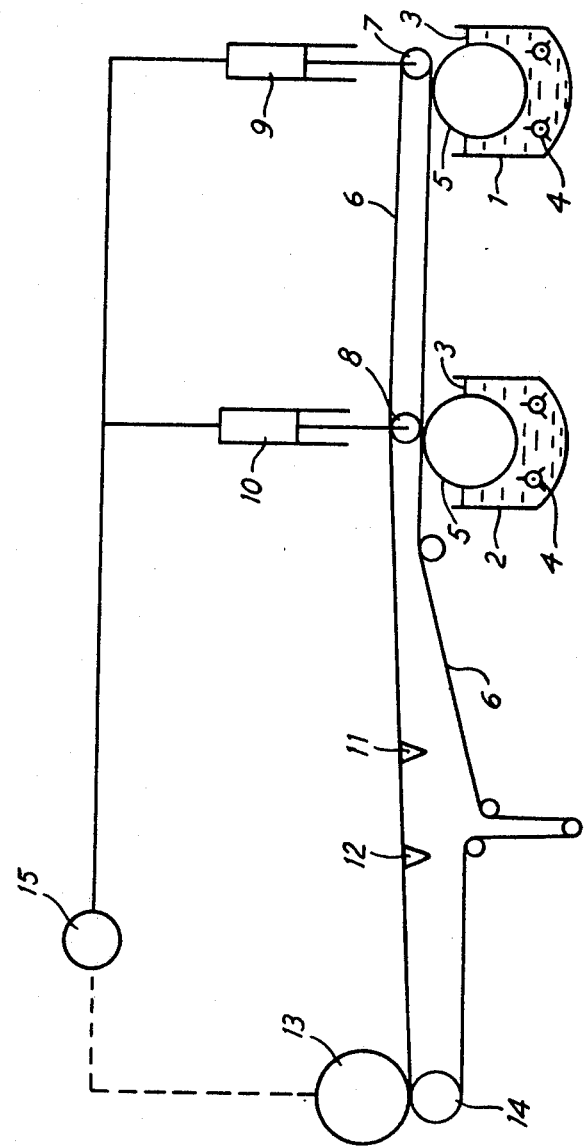

PROCESS FOR THE MANUFACTURE OF COMPOSITE MATERIALS

This invention relates to the manufacture of composite materials comprising a matrix of set inorganic binder and fibre reinforcement.

Composite materials comprising a set inorganic binder (e.g. Portland cement) and fibre reinforcement (such as glass fibres), especially in the form of sheet or pipe, are commonly made by a process in which an aqueous slurry containing water-settable inorganic binder, reinforcing fibres (other than asbestos fibres, which for health reasons are no longer used) and web-forming fibres is dewatered, and the binder in the dewatered slurry is subsequently set, sometimes simply by being allowed to stand, sometimes by autoclaving or other moderate heating procedure. The web-forming fibre (usually cellulosic fibre) present in the slurry facilitates formation of a web in whatever plant (e.g. Hatschek, Magnani or Fourdrinier machine, or a simple press) is to be used to convert the binder and reinforcing fibres into the shaped state. The slurry, at least half of whose solids content is ordinarily formed by the water-settable inorganic binder, may also contain additional ingredients, such as perlite to modify the density of the composite material, exfoliated vermiculite to maintain its integrity in an outbreak of fire, or flocculant (e.g. polyacrylamide or other polyelectrolyte) in very small amount (e.g. 0.1% by weight) to improve drainage of water from the web and improve retention of fine particulate raw material in it.

By use of the process as just outlined for making composite material comprising a matrix of set inorganic binder and reinforcing fibres, it is often found that, during the later stages of setting of the binder, the composite material shrinks, and this very often leads to warping.

We have now found that shrinkage can be considerably reduced by including a ball clay in the slurry that is dewatered, suitably in an amount forming from 1 to 30% by weight of slurry solids. A preferred range of ball clay content is 5-25% by weight, and 10-20% is particularly preferred.

Ball clay is a fine-grained, highly plastic, mainly kaolinitic sedimentary clay. (The terms 'kaolinitic' and 'kaolinite' are mineralogical ones, indicating chemical composition and chemical structure; they are not to be confused with the term 'kaolin', used to denote a highly refractory clay which approaches the mineral kaolinite in chemical composition and structure but which—by contrast with ball clay—is hardly plastic at all.) Various types of ball clay have varying proportions of kaolinite, micaceous material, and quartz, with small amounts of organic matter and other minerals. Ball clays are used mainly in the manufacture of pottery and refractories—not by themselves, for they show excessive shrinkage, which may be as high as 20% when fired, but in admixture with other clays (such as the kaolin mentioned earlier) to impart plasticity to them and to increase the green strength of the unfired ware. The plasticity of ball clays, for which they are valued, is probably due to a combination of fine particle size and the presence of colloidal carbonaceous matter such as the so-called humic acids.

The invention can be applied to the manufacture of composite materials from any of the conventional water-settable inorganic binders. Thus, besides ordinary Portland cement, there may be used high alumina cements, slag cements and calcium silicate binders. As to the fibrous reinforcement, there may be used carbon fibres and high modulus aromatic polyamide and poly(amide-hydrazide) fibres, particularly fibres of poly(p-benzamide) available under the name Kevlar, or cheaper fibres such as glass, polypropylene or steel. If carbon fibres are used, those having a low Young's modulus (tensile modulus), not greater than $125 \times 10^9$ Pascals, are preferably employed. Carbon fibres of modulus in the range 10-100 GPa, and particularly 15-80 GPa, are specially preferred. We have found that low modulus carbon fibres are very readily dispersible in an aqueous suspension of water-settable inorganic binder, web-forming fibres and ball clay, and this ready dispersibility is in turn reflected in improved properties, especially reduced cracking, in the eventual composite material. Carbon fibre is preferably employed in an amount forming 0.1 to 2.5% by weight of the solids of the slurry, and in fibres length up to 100 mm, preferably 3 to 50 mm, with the range 4-10 mm being particularly preferred. Carbon filament diameter may, for example, be 10-25 μm.

The web-forming fibre employed is suitably cellulose, particularly that in cellulose pulp having a degree of freeness 50-95 on the Schopper Reigler scale; alternatively a so-called synthetic pulp of polyolefin (polypropylene or polyethylene), particularly having a degree of freeness 5° to 40° Schopper Reigler, may be used. Web-forming fibre will ordinarily form from 0.5 to 5% by weight of slurry solids.

The invention will now be further described with reference to the accompanying drawing, which is a diagram of a conventional Hatschek machine set up for sheet manufacture. The machine has troughs 1 and 2 in each of which a constant level 3 of aqueous slurry is maintained by controlled delivery of (a) more concentrated slurry from an associated reservoir (not shown) equipped with agitators to keep solids in suspension, and (b) dilution water to maintain the total solids content of the slurry in each trough at a suitable level, say 5% by weight. In the troughs themselves, the solids are kept suspended in the aqueous medium by paddles 4. Mounted in each trough is a rotary sieve 5, against which an endless conveyor felt 6 (which in the drawing rotates anti-clockwise) can be pressed by couch rollers 7 and 8 in response to pressure from actuators 9 and 10 respectively, so that solids taken up from each trough onto its associated rotary sieve can be formed into a layer on the felt 6. The layer thus formed is de-watered as the free-draining felt moves on, de-watering being substantially completed as the felt passes over vacuum boxes 11 and 12. The layer of de-watered slurry is transferred from the felt 6 to the forming roll or 'bowl' 13 by press roller 14. When a thickness appropriate for the desired product has been built up on bowl 13, the material is slit axially (in response to a signal from control system 15 which counts the number of revolutions of the bowl) and removed from the bowl as sheet, and the water-hardenable binder component of it is allowed to set at ambient temperature or is set by autoclaving or other moderate heating of the material.

In applying the invention to the manufacture of composite material which includes low-modulus carbon fibre as reinforcing fibre, the troughs 1 and 2 are for example kept filled with aqueous slurry (solids:water = 1:25 by weight) made by adding to water at 45°

C. the following ingredients in the following proportions by weight.
  Carbon fibre (length, 10 mm; average diameter, 13 μm; average Young's modulus, 25 GPa): 1.4%
  Ordinary Portland cement: 80.6%
  Wood pulp (Schopper Reigler 55): 3.0%
  Ball clay (bulk density 900 kg/m$^3$; predominant particle size less than 1 μm): 15.0%

If for example a composite sheet material of thickness about 6 mm is required, then with the conveyor felt rotating anti-clockwise in the drawing, rolls 7 and 8 are actuated to bring about deposition of slurry material from the slurry in troughs 1 and 2 onto the conveyor felt, and the formation on bowl 13 of a de-watered layer of slurry containing carbon fibre, Portland cement, cellulose fibre and ball clay. Build-up is continued until a de-watered slurry layer 6 mm thick has been formed. Rolls 7 and 8 are then deactuated, and the material on bowl 13 is slit, stripped from the bowl, laid flat to form sheet, moulded to a desired (e.g. corrugated) form, and then set by being allowed to stand for 12 hours to form set composite material of acceptable flexural strength and impact strength. During setting of the Portland cement ingredient of the de-watered slurry, there was during a typical run practically no linear shrinkage (less than 0.25%) and no visible cracking of the shaped material.

A slurry formulation which is particularly effective for hand moulded goods where a very high degree of plasticity in the de-watered sheet is required is as follows:
  Low-modulus carbon fibre (length 5 mm): 1.5%
  Ordinary Portland cement: 69.5%
  Wood pulp: 4.0%
  Ball clay: 25.0%

A slurry formulation which is particularly useful for the production of pipes to convey potable water is as follows:
  Low-modulus carbon fibre (length 10 mm): 1.4%
  Ordinary Portland cement: 80.6%
  Wood pulp: 2.0%
  Synthetic Pulp (Solvay's polyethylene Pulpex): 1.0%
  Ball clay: 15.0%

This formulation has a reduced content of cellulose (bio-degradable material).

I claim:

1. A process for the manufacture of an asbestos-free composite material comprising a matrix of set inorganic binder and fibrous reinforcement, comprising dewatering an aqueous slurry containing:
   (a) water-settable inorganic binder in an amount forming at least half of the solids content of the slurry,
   (b) web-forming fibres selected from cellulose fibres, polyethylene fibres and polypropylene fibres,
   (c) reinforcing carbon fibres of tensile modulus not greater than 125 GPa, in an amount forming from about 0.1 to about 2.5% by weight of the solids content of the slurry, and
   (d) ball clay in an amount which forms from about 5 to 30% by weight of the solids content of the slurry and is such as to reduce shrinkage of the composite material during setting of the inorganic binder.

2. A process according to claim 1, in which water-settable inorganic binder is Portland cement.

3. A process according to claim 1, in which ball clay forms 10–20% by weight of slurry solids.

4. A process according to claim 1, in which said carbon fibre modulus is in the range 10–100 GPa.

5. A process according to claim 1, in which said carbon fibre modulus is in the range 15–80 GPa.

* * * * *